United States Patent [19]

Sandford, II et al.

[11] Patent Number: 5,727,092
[45] Date of Patent: Mar. 10, 1998

[54] COMPRESSION EMBEDDING

[75] Inventors: Maxwell T. Sandford, II; Theodore G. Handel; Jonathan N. Bradley, all of Los Alamos, N. Mex.

[73] Assignee: The Regents of the University of California, Oakland, Calif.

[21] Appl. No.: 442,592

[22] Filed: May 17, 1995

[51] Int. Cl.$^6$ .................................................. G06K 9/00
[52] U.S. Cl. .................................................. 382/251; 382/235
[58] Field of Search .................................... 382/168, 170, 382/248, 250, 232, 166, 233, 235, 236, 237, 238, 244, 251, 274, 275; 380/7, 10, 54; 395/162, 118, 101; 358/470, 456, 426, 261.1, 261.2, 261.3, 261.4, 427, 262.1

[56] References Cited

U.S. PATENT DOCUMENTS

| | | | |
|---|---|---|---|
| 4,216,500 | 8/1980 | St. Louis | 380/7 |
| 4,700,294 | 10/1987 | Haynes | 364/200 |
| 4,780,718 | 10/1988 | Hudson et al. | 342/25 |
| 4,949,381 | 8/1990 | Pastor | 380/54 |
| 5,065,446 | 11/1991 | Suzuki et al. | 382/56 |
| 5,070,402 | 12/1991 | Ishii et al. | 358/135 |
| 5,187,755 | 2/1993 | Aragaki | 382/250 |

*Primary Examiner*—Leo Boudreau
*Assistant Examiner*—Bijan Tadayon
*Attorney, Agent, or Firm*—Milton D. Wyrick

[57] ABSTRACT

A method of embedding auxiliary information into the digital representation of host data created by a lossy compression technique. The method applies to data compressed with lossy algorithms based on series expansion, quantization to a finite number of symbols, and entropy coding. Lossy compression methods represent the original data as integer indices having redundancy and uncertainty in value by one unit. Indices which are adjacent in value are manipulated to encode auxiliary data. By a substantially reverse process, the embedded auxiliary data can be retrieved easily by an authorized user. Lossy compression methods use loss-less compressions known also as entropy coding, to reduce to the final size the intermediate representation as indices. The efficiency of the compression entropy coding, known also as entropy coding is increased by manipulating the indices at the intermediate stage in the manner taught by the method.

11 Claims, 11 Drawing Sheets

```
/*      Process histogram to select embedding pairs */
j = 0;
for(i=0;i<H_TABLE_SIZE;i++)    {
        lsum = hist_table[i]+hist_table[i+1];
        lavg = lsum/2L;
        ldiff = hist_table[i]-hist_table[i+1];
        ldiff = labs(ldiff);
        if(ldiff < lavg) {   /* Difference less than avg. for pair */
                pair[j].i = i+(int)minval;
                pair[j].j = i+(int)minval+1;
                pair[j].count = (unsigned long)lsum;
                j++;
                i+=2;
                if(j==MAXPAIRS)break;
                }
        }
lsum = 0L;
no_pairs = duplicate(j,pair);
for (i=0;i<no_pairs;i++) {
   if(pair[i].i==pair[i].j)break;
   printf("\npair[%3d] %4d %4d %5ld", i,\
                pair[i].i, pair[i].j, pair[i].count);
   lsum += pair[i].count;
}
no_pairs = i;
printf("\n%d pairs located.  %ld total embedding bits",
no_pairs, lsum);
```

*Fig. 5*

```
/*    DUPLICATE: Routine to remove entries containing duplicate
                 histogram values in the PAIRS structure
 *    INPUT:     no_pairs, integer no. of pairs in the pixel pair
                 table
 *               pixpairs, table of PAIRS structures
 *    RETURN:    new value for no_pairs (0 if no entries exist)
 *    AUTHOR:    Copyright (c) 1994-95, M. T. Sandford II
 *               Univ. of California, Los Alamos National
                 Laboratory
 ********************************************************/
include <stdlib.h> struct PAIRS {          /* structure of pallet pair data entries */
     int i;
     int j;
     unsigned long count;
};
int duplicate (int nopairs, struct PAIRS *pair) {
int i;        /* counters */
int j;
int k=0;
if(nopairs == 0)return k;    /* return if nothing to do */
p_sort(pair,k);    /* sort pairs by frequency of occurrence */
for(i=0;i<nopairs;i++)      {
      if(pair[i].count==0L)continue;
      for(j=0;j<nopairs;j++)     {
           if(j==i)continue;
```

*Fig. 6A*

```
                if(pair[j].count==0)continue;
                    if(pair[j].i == pair[i].i ||
                        pair[j].i == pair[i].j ||
                        pair[j].j == pair[i].i ||
                        pair[j].j == pair[i].j) {
                            if(pair[j].count < pair[i].count)
                                pair[j].count = 0;
                            else {
                                pair[i].count = 0;
                                break;
                            }
                        }
                    }
                }
            }
            for(i=0;i<nopairs;i++) { /* remove null entries from pair table */
                j = i+1;
                while(pair[i].count == 0) {
                    for(k=j;k<nopairs;k++)
                        pair[k-1] = pair[k];
                    nopairs--;
                    if(nopairs==0) break;
                }
                if(nopairs==0)break;
            }
        return i;
        }
```

*Fig. 6B*

```
/*****************************************************************
 * JUMBLE.C: Routine to jumble a table of indices using pseudo-random
 *           numbers seeded from the PC clock
 * INPUT:    index, pointer to a table of jumbled integers
 *           npts, integer no. of entries in the index table
 * RETURN:   nothing
 * OUTPUT:   returns a jumbled table of integers
 * AUTHOR:   M. T. Sandford II, 5 Oct. 1994, following the method
 *           preferred by T. Handel
 *****************************************************************/
void jumble(int *index, int npts) {
int i;
float fi;
struct POINTS {
    float gamma;
    int i;
} *index_pts;
index_pts = malloc(sizeof(struct POINTS)*nindex_pts);
for (i=0;i<nindex_pts;i++) {
    index_pts[i].i = i;
    index_pts[i].gamma = (float)rand()/(float)RAND_MAX;
}
qsort( (void *)index_pts, (size_t)nindex_pts, sizeof(struct POINTS),
                index_compare);
for(i=0;i<nindex_pts;i++) {
        index[i] = index_pts[i].i;
```

*Fig. 7A*

```
/*      printf("\ni,index[i] %d %d", i, index[i]); */
        }
if(index[0]==0) {
    fi = (float)rand()/(float)RAND_MAX;
    fi *= (float)(nindex_pts-1)+1.0f;
    index[0] = index[(int)fi];
    index[(int)fi] = 0;
    }
free(index_pts);
}

/*  comparison routine for sorting points structure values  */
int index_compare(const void *p1, const void *p2) {
    if((float *)p1 > (float *)p2)return(1);
    if((float *)p1== (float *)p2)return(0);
    else return(-1);
    }
```

*Fig. 7B*

```
/******************************************************************
 *     embed_data_block: Routine to embed data into a block of integers using
 *                       the pairs in the structure pair.
 *     INPUT:    buffer, pointer to the block of integers
 *               i,      integer no. of integers in the block
 *               pair,   pointer to index pair structures
 *               no_pairs, number of pair structures
 *     RETURN:   nothing
 *     AUTHOR:   Copyright (c) University of California, 1995
 *               M. T. Sandford II
 ******************************************************************/
void embed_data_block(unsigned char *buffer,int i,struct PAIRS *pair,int no_pairs) {
short index;
int j;
int k;
float test;
    for(j=0;j<i;j+=2)   {
            memcpy(&index,buffer+j,2);
            for(k=0;k<no_pairs;k++) {
                    if(index==pair[k].i || index==pair[k].j) {
                            embed_count++;
                            if(aux_bit()) {
    /* aux. bit is a 1 */
                                    index = pair[k].j;
                            }
```

*Fig. 8A*

```
            else {       /* aux. bit is a 0 */
                    index = pair[k].i;
                }
                memcpy(buffer+j,&index,2);
            }
        }
    }
    return;
}
```

*Fig. 8B*

COMPRESSION EMBEDDING

This invention was made with Government support under Contract No. W-7405-ENG-36 awarded by the U.S. Department of Energy. The Government has certain rights in the invention.

FIELD OF THE INVENTION

The present invention generally relates to digital manipulation of numerical data compressed by "lossy" compression methods. More specifically, the invention relates to a means for the embedding of external data into the intermediate numerical values determined by the lossy compression method.

BACKGROUND OF THE INVENTION

The use of data in digital form is revolutionizing communication throughout the world. Much of this digital data communication is over wire, microwaves, and fiber optic media. When it is necessary to transmit large amounts of data, innovative methods to minimize the communication time are required. Transmissions of digital television, for example, use data compression methods to accomplish this minimization. A class of these methods is termed "lossy compression." The class is termed 'lossy' because the compression methods reduce slightly the quality of the original data. Multi-media computing applications use lossy compression of image and audio data to improve performance and reduce data storage requirements.

In many situations, it may be of benefit to send particular secondary data along with the primary data. Secondary data could involve the captioning of television programs, identification information associated with photographs and audio signals, data to authenticate or validate the host information, or data impressed as a digital watermark signature.

The secondary data can be embedded using methods to modify the noise component of the data as disclosed in copending application Ser. No. 08/392,642, filed Feb. 23, 1995, for DATA EMBEDDING. Lossy compression methods modify the noise component and degrade slightly the fidelity of the original host data. This loss in fidelity destroys any information which has been embedded into the noise component of the host data, as is taught by the above described application. This means that lossy compression is incompatible with prior data embedding methods.

Redundancy and uncertainty are intrinsic to lossy compression methods. Two examples of lossy compression are the Joint Photographic Experts Group (JPEG) standard, and the Wavelet Scalar Quantization (WSQ) algorithm that has been adopted by the Federal Bureau of Investigation for the electronic interchange of digital fingerprint information. The JPEG algorithm is based on the Discrete Cosine Transform (DCT) representation of the host data. The WSQ method is based on a representation of the host data in terms of wavelet functions. In both methods, the host data representation exists in an intermediate stage as a sequence of integer values referred to as 'indices.' At this intermediate stage, loss of fidelity has occurred because the transform coefficients that represent the data have been quantized to a finite number of integer representations. Redundancy occurs in both lossy compression methods because the same integer values occur many times in the compression sequence of indices. Uncertainty occurs in the integer representation because the uncertainty in the original host data is present also in its transform representation. Thus, the integer representation values are individually uncertain by at least ±1 unit of value.

The existence of redundancy and uncertainty in the compression data permits a process for implanting additional information into the compressed representation of the host data. Because the expansion of the compressed data returns an approximation to the original information, the efficiency of the lossy compression is unaffected by embedding the additional information. The embedded information can be extracted to a parallel channel by hardware or software added to the compression expansion algorithm. The embedding of information in this manner does not increase the bandwidth required for the transmission of the compressed data because the data implanted reside in the coefficients representing the original data. One may convey thereby meaningful, new information in the redundant coefficients of the lossy compression representation without it ever being detected by unauthorized persons.

This invention is based on the above-described copending application, but expands the data embedding principle of that application to a new regime. Compression embedding as taught in the present application is different than the data embedding as taught in the copending application because compression embedding adds additional data by manipulating the intermediate numerical representation of the host created by a lossy compression method instead of manipulating the host data values as is taught in the copending application.

It is therefore an object of the present invention to provide apparatus and method for embedding data into a digital information stream so that the digital information is not changed significantly.

It is another object of the present invention to provide apparatus and method for thwarting unauthorized access to information embedded in data compressed with lossy algorithms.

It is yet another object of the present invention to provide apparatus and method for allowing authorized extraction of embedded data from a digital information stream.

Additional objects, advantages, and novel features of the invention will be set forth in part in the description which follows, and in part will become apparent to those skilled in the art upon examination of the following, or learned by practice of the invention. The objects and advantages of the invention may be realized and attained by means of the instrumentalities and combinations particularly pointed out in the appended claims.

SUMMARY OF THE INVENTION

In accordance with the purposes of the present invention there is provided a method of embedding auxiliary data into host data compressed by lossy compression methods that use series expansion and quantization techniques, comprising the steps of creating a digital compression representation of the host data in terms of intermediate integer indices representing coefficients, the digital compression representation having certain statistical properties; creating a digital representation of the auxiliary data in the form of a sequence of individual bit values; evaluating the digital compression representation to determine pairs of integer indices differing by a specified number of units and occurring with similar frequency in the digital compression representation; replacing individual integer indices in the digital compression representation with substantially equivalent values from the pairs of integer indices in order to embed individual bit values corresponding to the sequence of individual bit values of the auxiliary data; and outputting the digital compression representation with the auxiliary data embedded into a file format specified for the compressed data.

In another aspect of the present invention there is provided a method of extracting embedded auxiliary data from a digital compression representation containing integer indices representing coefficients in a series expansion approximating original data comprising the steps of extracting from the digital compression representation a bit sequence indicative of the embedded auxiliary data, and which allows for verification of the digital compression representation; interpreting the digital compression representation to determine pairs of said integer indices which correspond to bit values of the auxiliary data; and identifying the auxiliary data as a file.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 5 is a partial listing of computer code used for determining the pairs of integer indices suitable for embedding data.

FIG. 6 is a listing of computer code used for eliminating duplicate host data pairs.

FIG. 7 is a listing of computer code that performs a randomization of the pairs of indices in order to provide security against unauthorized access to the embedded information.

FIG. 8 is a partial listing of computer code that performs the actual embedding of auxiliary data into the compression representation.

DETAILED DESCRIPTION

Figure 1:
FIG. 1 is a reproduction of the grey scale image example used to describe the invention.

The present invention allows data to be embedded into information compressed with a lossy method without naturally discernible alteration of the content and meaning of the reconstructed data. This is made possible because of the technique of the present invention, in which similar integer indices in a lossy compression representation are re-ordered according to the desired embedded or implanted information. The lossy compression examples are digital images compressed using JPEG and WSQ methods. The resulting images contain embedded auxiliary information without that information being readily discernible.

The JPEG method is given in an article by Gregory K. Wallace, "The JPEG Still Picture Compression Standard," Communications of the ACM, April 1991 (vol. 34 no. 4), pp. 30–44. The JPEG algorithm is used primarily for compressing digital images. A PostScript file containing a revised version of the article is available for electronic reference at ftp.uu.net, graphics/jpeg/wallace.ps.Z. A somewhat less technical, more leisurely introduction to JPEG can be found in The Data Compression Book by Mark Nelson, published by M&T Books (Redwood City, Calif.), 1991, ISBN 1-55851-216-0. A detailed textbook about JPEG is JPEG Still Image Data Compression Standard by William B. Pennebaker and Joan L. Mitchell, published by Van Nostrand Reinhold, 1993, ISBN 0-442-01272-1. The JPEG format is represented by ISO standards DIS 10918-1 and DIS 10918-2.

The Independent JPEG-Group's C-language source code is available electronically from ftp.uu.net (Internet address 137.39.1.9 or 192.48.96.9). The most recent released version can always be found there in directory graphics/jpeg.

The WSQ method as applied to compressing digital fingerprint images was given by J. N. Bradley and C. M. Brislawn, "The wavelet/scalar quantization standard for digital fingerprint images," Proc. of the 1994 IEEE Intern. Symp. on Circuits and Systems, vol. 3, pp. 205–208, 1994, and by J. N. Bradley, C. M. Brislawn, and T. E. Hopper, "The FBI wavelet/scalar quantization standard for gray-scale fingerprint image compression," Proc. SPIE, vol. 1961, pp. 293–304, April, 1993. Documentation for WSQ compression is available through Jonathan N. Bradley, Los Alamos National Laboratory, P.O. Box 1663, MS-B265, Los Alamos, N.M. 87545, and electronically from the Internet FTP site "ftp.c3.lanl.gov" in directory/pub/WSQ.

The JPEG method compresses the host image in pixel blocks specified to the algorithm at the time the indices are calculated. The WSQ method compresses the host image by passing it through a series of multirate filters. In both the JPEG and WSQ algorithms, the image host data exist in an intermediate stage as a sequence of integer (16-bit) indices. The indices represent an image originally presented in a standard digital format. The characteristic of lossy compression that makes possible the invention is redundancy and uncertainty. Each integer index occurs typically many times in the compressed representation, and each index is uncertain in value due to uncertainty in the host data. The present invention creates a histogram of the integer indices in the compressed representation. This histogram shows the probability density of the integer values in the representation, and plots the number of times a particular value occurs versus the value. For JPEG compression, values in the range ±1024 are sufficient, and for WSQ compression values in the range ±4096 are considered. A particular distribution of values will depend on the image content, but both compression methods concentrate many values in a pattern symmetrical about 0.

FIG. 1 is a reproduction of the greyscale image example. The invention works equally well with color images. The grey scale image example in FIG. 1 does not represent a limit to the application of the invention. The grey scale example image is reproduced in FIG. 1 at reduced scale and quality to facilitate printing. The reproduction in FIG. 1 demonstrates only the nature of the image example, and the figure does not convey a representation of the image quality appropriate to the invention. Images expanded from compression representations with data embedded are visually identical to those expanded from unmodified compression data.

Figure 2:
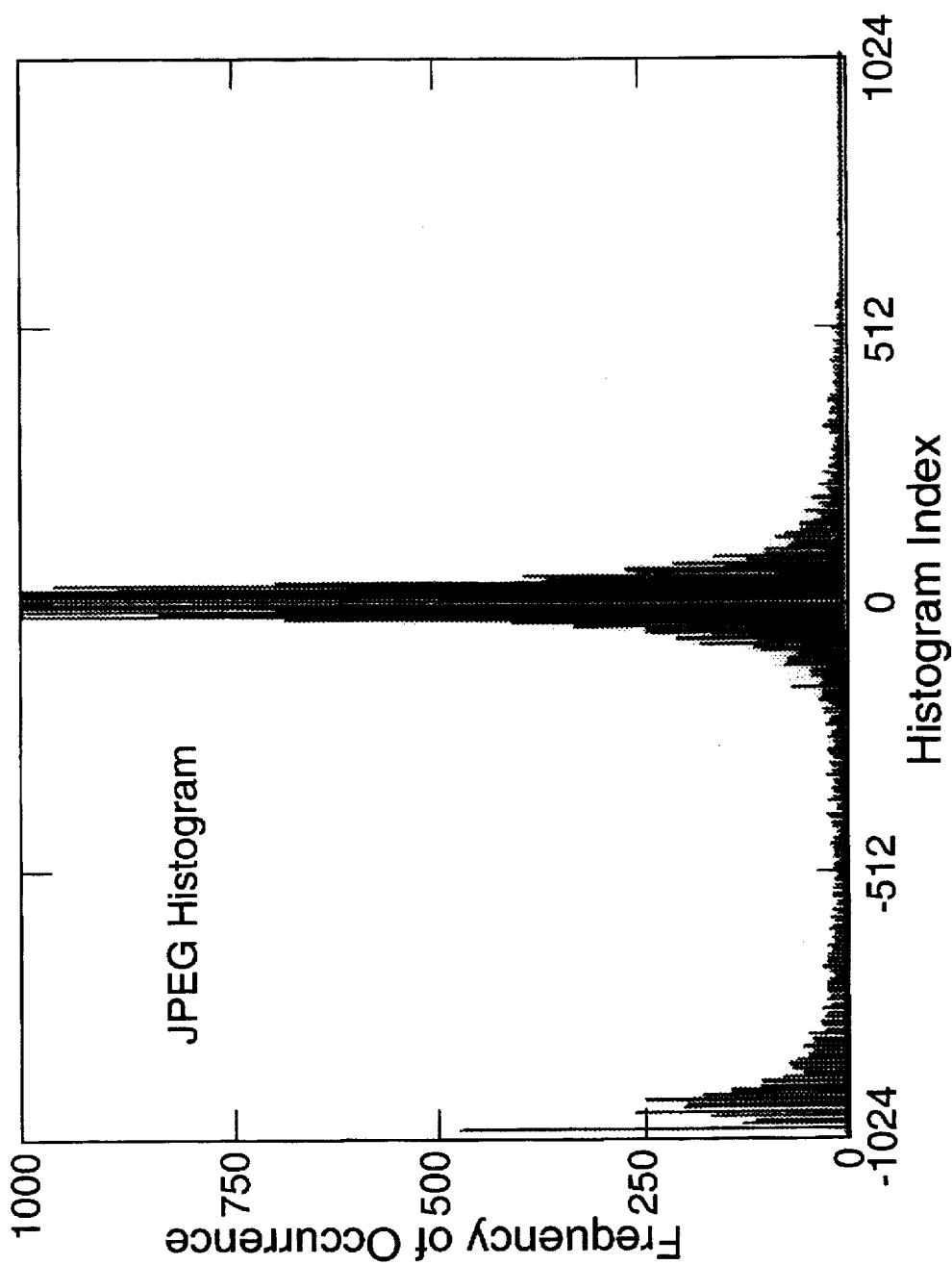
FIG. 2 is a plot of the histogram of the integer representation of the image in FIG. 1 compressed with the JPEG method.
Figure 3:
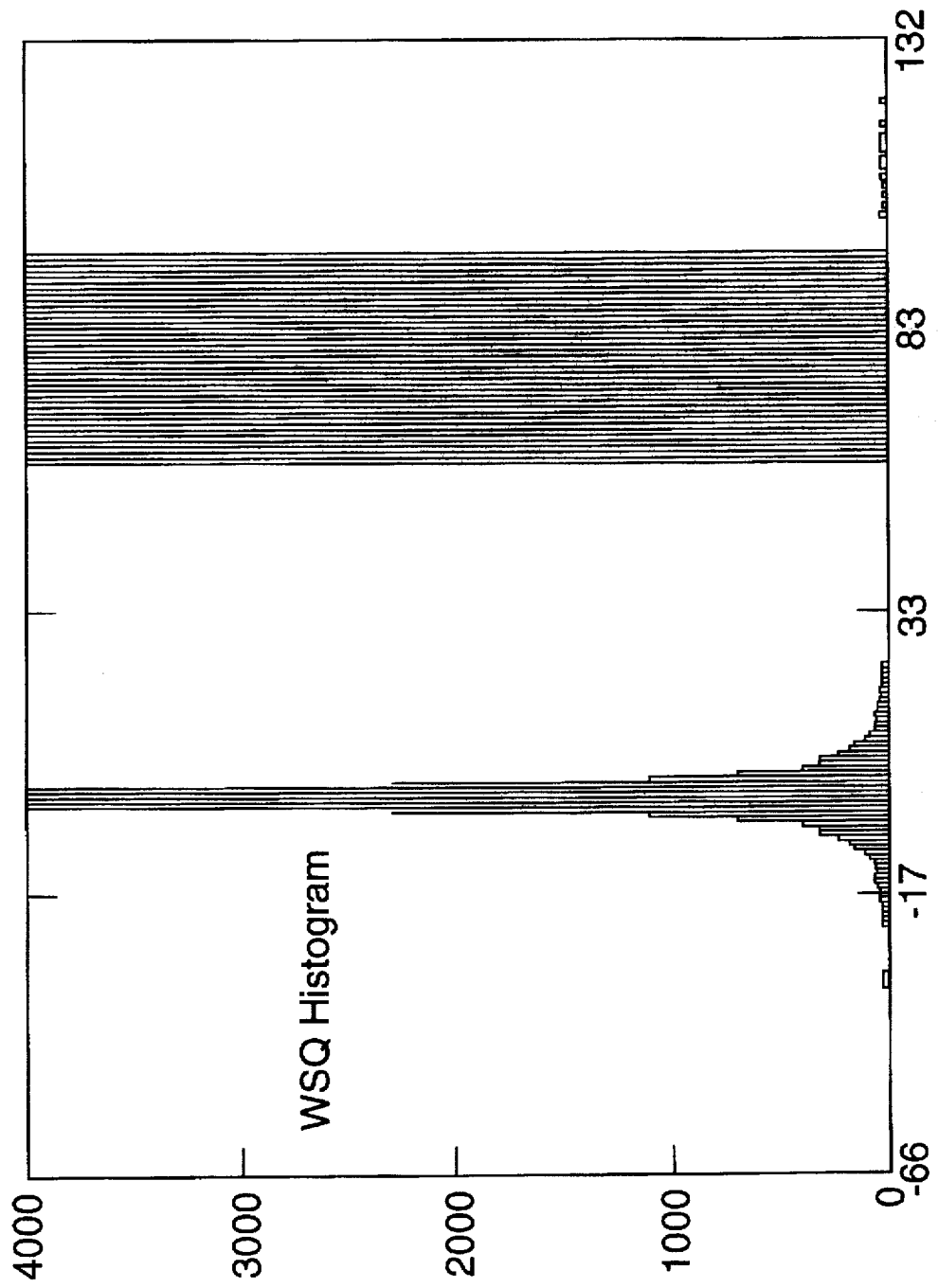
FIG. 3 is a plot of the histogram of the integer representation of the image in FIG. 1 compressed with the WSQ method.

Histograms of the indices for the image example in FIG. 1 are shown in FIGS. 2 and 3, for JPEG and WSQ compression, respectively. FIG. 2 shows the histogram for the JPEG compression representation, for the image sample shown in FIG. 1, and compression ratio about 12:1. The file size for the JPEG version of FIG. 1 is 42953 bytes. Analysis of this image according to the invention identifies 50 pairs of values in the histogram, totalling 3573 bytes of embedding space.

FIG. 3 shows the histogram for the WSQ coefficient representation of the image sample shown in FIG. 1, and compression ratio about 20:1. Analysis of these coefficients according to the invention identifies 37 pairs of values in the histogram, totalling 471 bytes of embedding space. The WSQ histogram contains fewer coefficients than produced by the JPEG method owing to the larger compression ratio, but the invention nevertheless permits embedding information into the compressed representation.

Figure 4:
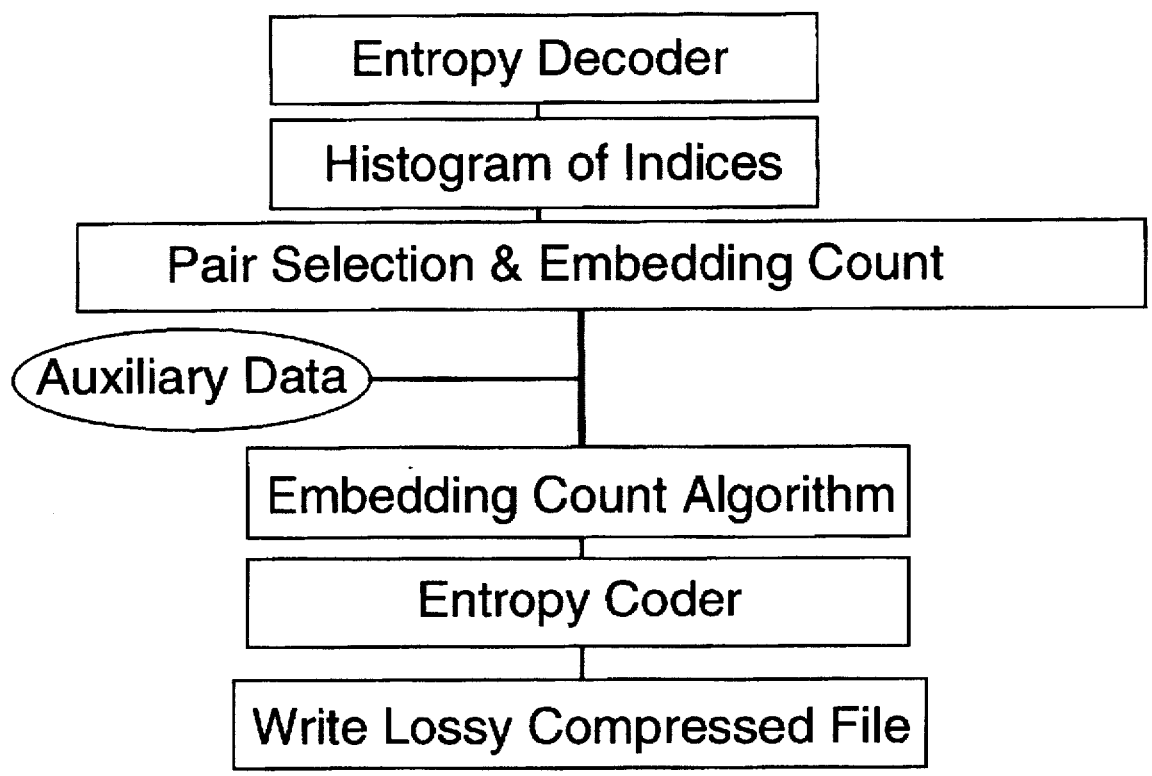
FIG. 4 is a block diagram illustrating the processes used in the embedding and extraction of data from the integer indices of a lossy-compressed data host.

The actual embedding of the auxiliary data into the compressed representation of integer indices is a three-part process, the basic steps of which are shown in FIG. 4. First, the indices are examined to identify pairs of intermediate integer indices having values that occur with approximately the same statistical frequency, and that differ in value by only one unit. Second, the order of the integer indices pair values is randomized to generate a unique key sequence that cannot be duplicated by an unauthorized person. Third, the pairs of indices identified in the compressed integer representation are used to re-order the indices in the compressed representation in accordance with the bit values in the sequence of auxiliary data bits. The key sequence is optionally appended to the compressed data file.

Extracting embedded data inverts this process. The key sequence of pairs of index values is recovered from the compressed data file, or it is supplied as information separate from the compressed data. The key specifies the pair-values of indices differing by one unit in value. With the pair values known, the extraction consists of recreating the auxiliary data according to the sequence of occurrence of the indices in the compressed representation. The key data are used first to extract header information. The header information specifies the length and the file name of the auxiliary data, and serves to validate the key. If the compressed file contains no embedded information, or if the incorrect key sequence is used, the header information will not extract correctly. However, successful extraction exactly recreates the auxiliary data in an output file.

The principle of data embedding according to the present invention involves the rearrangement of certain values in a lossy compression representation in order to encode the values of the extra data which is to be added. For the purposes of this description of the invention, consider the compression representation to consist of a sequence of integer values or indices. Further assume that any intermediate index value is uncertain by ±1 unit in value. The frequency of occurrence or histogram value of a certain index i is f(i).

Two values i and j in the table of indices are candidates as embedding pairs if:

$$|i-j|=1. \quad 10$$

For this example of the invention, j=i+1. Index values meeting the criterion of Eq. 10, and occurring also in the representation with f(i)−f(j)<δ, where f(i) and f(j) are the probability of occurrence of adjacent intermediate index values, and δ is the tolerance imposed for statistical equality, are candidates for embedding use. The values i and j meeting this constraint constitute a pair of index values $p_k$. There are k=0,1,2, . . . Np such pairs in the compression representation, giving a total number M of embedding bits:

$$M = \sum_i f(i) + \sum_j f(j). \quad 20$$

The summations of i and j run over a limited range of the intermediate indices. In the example given here, the summation limits are specified at ±1024.

It is now helpful to refer to FIG. 5, wherein a partial listing of computer code in the C-language is printed. The loop beginning at line 3 in FIG. 5 processes the histogram table to identify pairs of indices meeting the specifications above. The table values are stored in the variable hist_table, having H_TABLE_SIZE entries. FIGS. 2 and 3 show the histogram data for sample JPEG and WSQ compression representations. The code in line 8 compares the absolute difference of the frequency of occurrence f(i) and f(j) with the average value of the two occurrence frequencies. Pairs differing by less than the average value are accepted in this example. This simple selection scheme prevents an artificially large modification to the indices in the compression representation. For example, if f(i)=1000 and f(j)=200, the absolute difference is 800 and the average is 750. This pair will be rejected as an embedding candidate. However, if f(i)=1000 and f(j)=750, the absolute difference and the average are 250 and 875, respectively, and this pair will be accepted. This, or a similar scheme for selecting pairs for approximate equality of their component's frequency of occurrence minimizes perceptible differences in the image expanded from the compressed representation containing embedded data.

The pairs selected from the histogram are stored in the data structure array element pair[j] in lines 9, 10, and 11. In the example in FIG. 5, the data structure permits MAX-PAIRS pairs to be selected. The structure element pair[j] .count contains the total number of occurrences of the (i,j) values in the histogram table. Line 18 uses the routine duplicate() to remove duplications from the pair table. Code starting in line 19 calculates the total number of pairs, no_pairs, and lsum, the total number of bits that can be embedded into the compression indices. M, in Eq. 20 defines the calculation performed in the loop starting at line 19.

The embedding process ignores completely the contribution the index values make to the compression representation. In JPEG compression, the values represent the coefficients in a discrete cosine transform performed over pixels in a square block of the image data. Usually, 8×8 pixel blocks are used, but the details of the transform and the tiling of the image data are irrelevant for embedding. In WSQ compression, the indices are determined by quantizing the discrete wavelet transform coefficients which are calculated by repeated applications of a multirate filter bank. Again, details of the wavelet calculations and the sampling size are ignored in the selection and use of the embedding pairs.

Depending on the details of the selection algorithm, the index pairs found can include generally redundant values. The same index value i, is found perhaps in several different pair combinations. Because multiple pairs cannot contain the same index entry, due to each pair combination of index values having to be unique, it is necessary to eliminate some pairs. The number of pairs located by applying the criterion of Eq. 10 is stored in the variable j, in line 18.

Referring now to FIG. 6, the code fragment listed therein illustrates the manner in which duplicate pairs are eliminated by a separate routine. First, the histogram of the image is used to calculate the total number of occurrences of pair structure elements, in the variable j in FIG. 5. The algorithm given in FIG. 5 results in pairs selected in ascending index order. Before rejecting some pairs, the pairs are sorted in line 24 of FIG. 6, page 1 by order of decreasing frequency of occurrence value, pair[j].count. Sorting the pairs by occurrence frequency before rejecting duplicate pairs minimizes the number of pairs needed to embed a particular auxiliary data stream. The nested loops beginning at line 25 of FIG. 6, page 1 reject duplicate pair values containing the fewest occurrence frequencies. The routine revises the pair structure elements and returns the new no_pairs value.

The security of the embedded data is increased significantly if the pair values are arranged into random order.

Randomizing the order of the pair values is part of this invention and follows the code listing in FIG. 7. Randomizing is accomplished by rearranging the pair values according to a randomly ordered data structure. The structure named index_pts contains elements index_pts[k].i, k=0,1, 2, ... no_pairs; and index_pts[k].gamma, $\gamma_1, \ldots, \gamma_k, \ldots \gamma_{no\_pairs}$, where the $\gamma_k$ values are uniformly random on (0,1). The standard library routine qsort() is used to sort the data structure index_pts[ ]. Putting the random element values into ascending order randomizes the index element of the structure. The random index values are used with the pair structure elements calculated and sorted as indicated above, to re-order the table to give random pair ordering.

The actual embedding of auxiliary data into a compression representation consists of rearranging the order of occurrence of the redundant indices. The pairs selected for embedding contain the index values to be used in the rearrangement. It is important to realize that the numerical values used for embedding data are the index values already occurring in the compression representation. The embedding process of the current invention alters the entropy in the DCT or WSQ coefficients slightly, and the efficiency of compression is largely unaffected by embedding additional data into the indices values.

In the embedding process of the present invention, the coefficients calculated by the compression algorithm are manipulated in the order of the compression scheme used to generate the representation. JPEG and WSQ for the examples herein. The embedding process flows concurrently through the sequence of auxiliary data bits and the compression indices. Upon identifying a compression index matching one of the pair table values, the bit in the sequence of auxiliary data is examined to determine if the index is set to the pair[k].i value (embedding a 0), or set to the pair[k].j value (embedding a 1). The pair table is processed sequentially, in the order found after it was randomized by the code in FIG. 7.

FIG. 8 illustrates the code fragment that performs the actual embedding. The routine embed_data_block() embeds data into the block of data passed by the unsigned character pointer variable block. The loop index j increments by 2 each pass through the loop starting at line 20 in FIG. 8, page 1. The block pointer is used to extract the 16-bit integer into the variable index in line 21. Line 22 on page 1 of FIG. 8 begins the loop index k, searching the values of the pair[] data structure. When a pair element is found to match the index value, embedding is permitted. The auxiliary data bit to be embedded is returned by the external routine aux_bit(). For a one bit, the index variable is set to pair[k].j and for a zero bit, the index variable is set to pair[k].i. After setting the index variable, the proper two bytes in the block data array are loaded with the index variable value. The embedding proceeds as the index j strides through the compression representation indices.

The extraction of embedded data is accomplished by reversing the process used to embed the auxiliary bit stream. A histogram analysis of the compression representation containing embedded data will reveal the candidate pairs for extraction for only the case where the individual statistical frequencies of occurrence of the index values are unchanged by the embedding process. For most data, this is unlikely, and the pair value table recovered by an analysis is unlikely to be the same as the one used for embedding.

Owing to the uncertainty introduced by randomizing the order of the pair table, the embedded data are secure against unauthorized extraction from the compression representation. Indeed, detecting the presence of embedded data is difficult, if not impossible, because the only metric to use for such detection is a statistical analysis of the compression representation indices. Embedding affects the statistical properties only slightly and leaves no characteristic signature revealing the presence of embedded information.

As previously described, the ordered pairs of index values selected for embedding constitute the "key" for extraction of the auxiliary data from the compressed image. The listings illustrated in FIGS. 5 through 8 demonstrate how embedding analysis exploits redundancy and the statistical uncertainty in the compression representation to construct a table of pairs of index values. The key-pairs are required for extraction of the embedded data, but they cannot be generated by analyzing the compressed image representation after the embedding process is completed. However, the key values can be recreated from the original, unmodified compressed image. Compression embedding retains the one-time-pad encryption properties inherent in data embedding as disclosed in the above-described copending application, and incorporates the same high security to the embedded bit stream.

With the pair table known, extraction consists of sequentially testing the index values to recreate the output bitstream for the header information, and the auxiliary data. In the present invention, the pair table is inserted into the compressed image file header, or appended to the file end, where it is available for the extraction process. Optionally, the present invention permits removing the pair table and storing it in a separate file. Typically, the pair table ranges from a few to perhaps hundreds of index values in size. The maximum pair table size permitted depends upon the compression representation. For JPEG compression, FIG. 2 shows the index values concentrate near the origin and 50 to 100 pair values are adequate. For WSQ compressions of digital fingerprints, the index values spread over a larger spectrum and more pairs are required.

As with the data embedding process as disclosed in the copending application, another way of protecting the pair table key is to remove and encrypt it using public-key or another encryption process. The present invention permits an encrypted key to be placed into the compressed file, preventing extraction by unauthorized persons.

Embedding auxiliary data into the compression representation slightly changes the statistical frequency of occurrence of the index values. If the auxiliary bit sequence is pseudo-random, the frequencies of occurrence for the index pairs i and j are nearly equal after embedding. Modifying the histogram to force inequality in the frequencies of occurrence in adjacent values reduces entropy somewhat, and the entropy coding portion of the compression algorithm is found to operate with slightly greater efficiency, increasing the effectiveness of the lossy compression method. Thus, even if no auxiliary information is to be embedded, changing the statistical properties of the histogram pairs improves the compression ratio for lossy methods. Histogram modification to improve compression is part of this invention.

The foregoing description of the preferred embodiment of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of embedding auxiliary data into host data compressed by lossy compression methods that use series expansion and quantization techniques, comprising the steps of:

creating a digital compression representation of said host data in terms of intermediate integer indices representing coefficients, said digital compression representation having certain statistical properties;

creating a digital representation of said auxiliary data in the form of a sequence of individual bit values;

evaluating said digital compression representation to determine pairs of integer indices differing by a specified number of units and occurring with similar frequency in said digital compression representation;

replacing individual integer indices in said digital compression representation with values taken from a digital key comprising a schedule of said pairs of integer indices in order to embed individual bit values corresponding to said sequence of individual bit values of said auxiliary data; and outputting said digital compression representation with said auxiliary data embedded into a file format specified for said compressed data.

2. The method as described in claim 1 further comprising the step of combining said auxiliary data with predetermined information indicative of the presence of said auxiliary data, its file name, and file size, said step to be performed after the step of digitizing said auxiliary data.

3. The method as described in claim 1 further comprising the step of changing said statistical properties of said digital compression representation for the purpose of improving said lossy compression ratio methods.

4. The method as described in claim 1, wherein said digital compression representation originates from a color image compressed with the JPEG or WSQ algorithm, and their derivative compression representations.

5. The method as described in claim 1, wherein said digital compression representation originates from a black and white image compressed with the JPEG or WSQ algorithm, and their derivative compression representations.

6. The method as described in claim 1, wherein said digital compression representation originates from a television signal compressed with the MPEG and DCT-based algorithms, and their derivative compression representations.

7. The method as described in claim 1, wherein said digital compression representation originates from digital audio represented by lossy compression representations.

8. The method as described in claim 1, wherein said digital compression representation originates from X-ray or Magnetic Resonance Imaging data.

9. The method as described in claim 1, wherein said digital compression representation originates from personal security and identification information.

10. The method as described in claim 1, wherein said digital compression representation originates from fingerprint images.

11. The method as described in claim 1, wherein said digital compression representation originates from images made with a camera producing digital images.

* * * * *